(12) United States Patent
Iwai et al.

(10) Patent No.: US 10,967,516 B2
(45) Date of Patent: Apr. 6, 2021

(54) COMPONENT INSERTION DEVICE, COMPONENT INSERTION METHOD AND PROGRAM

(71) Applicant: OMRON Corporation, Kyoto (JP)

(72) Inventors: Yosuke Iwai, Kusatsu (JP); Masahiro Murai, Kusatsu (JP)

(73) Assignee: OMRON Corporation, Kyoto (JP)

( * ) Notice: Subject to any disclaimer, the term of this patent is extended or adjusted under 35 U.S.C. 154(b) by 275 days.

(21) Appl. No.: 16/218,444

(22) Filed: Dec. 12, 2018

(65) Prior Publication Data

US 2019/0275677 A1   Sep. 12, 2019

(30) Foreign Application Priority Data

Mar. 8, 2018 (JP) .............................. JP2018-042074

(51) Int. Cl.
B25J 9/16 (2006.01)

(52) U.S. Cl.
CPC .......... B25J 9/1687 (2013.01); B25J 9/1612 (2013.01); B25J 9/1633 (2013.01); G05B 2219/40028 (2013.01)

(58) Field of Classification Search
USPC .................................................. 700/245–264
See application file for complete search history.

(56) References Cited

U.S. PATENT DOCUMENTS

| 4,132,318 A * | 1/1979 | Wang .................... B25J 13/082 294/86.4 |
| 7,294,019 B1 * | 11/2007 | Jeon ................... H01R 13/6658 439/108 |
| 8,504,205 B2 * | 8/2013 | Summer ............... B25J 13/025 700/260 |
| 9,616,571 B2 * | 4/2017 | Yamaguchi ........... B25J 9/1692 |

(Continued)

FOREIGN PATENT DOCUMENTS

| CN | 1228673 | 9/1999 |
| CN | 206154336 | 5/2017 |

(Continued)

OTHER PUBLICATIONS

Yudai Fudaba, et al., "Teaching Data Characteristics for Direct Teaching using a Robot with a Dual-Shell Structure", 2012 IEEE RO-MAN: The 21st IEEE International Symposium on Robot and Human Interactive Communication, Sep. 9-13, 2012, pp. 81-87.

(Continued)

*Primary Examiner* — Jonathan L Sample
(74) *Attorney, Agent, or Firm* — JCIPRNET (57) ABSTRACT

A pair of claws and included in a gripper of a robot have specific shapes and for bending or flexing a specific part of a workpiece in a thickness direction when approaching each other to clamp the workpiece. The pair of claws and are made to approach each other and clamp the workpiece in a state where the specific part is protruded to the outside while making the workpiece and also the specific part undergo an elastic deformation so as to bend or flex in the thickness (Continued)

direction within a range of a transverse-direction dimension of the slot. The specific part of the workpiece is inserted into the slot along an insertion direction perpendicular to a tip end surface by a compliance control based on an output of a force sensor.

4 Claims, 10 Drawing Sheets

(56) References Cited

U.S. PATENT DOCUMENTS

| | | | | |
|---|---|---|---|---|
| 2003/0056561 A1* | 3/2003 | Butscher | ............... | B33Y 50/00 72/295 |
| 2006/0259195 A1* | 11/2006 | Eliuk | ............... | B65B 55/16 700/245 |
| 2011/0190932 A1* | 8/2011 | Tsusaka | ............... | B25J 13/08 700/254 |
| 2011/0192247 A1* | 8/2011 | Matsukuma | ............ | B25J 9/104 74/490.03 |
| 2014/0365009 A1* | 12/2014 | Wettels | ............... | B25J 15/0028 700/258 |
| 2015/0028613 A1* | 1/2015 | Nakayama | ........... | B25J 15/0206 294/196 |
| 2015/0115636 A1* | 4/2015 | Shiomi | ............... | B25J 15/12 294/106 |
| 2015/0248116 A1* | 9/2015 | Kawaguchi | ............ | B25J 9/1687 700/245 |
| 2017/0015002 A1* | 1/2017 | Ito | ................ | B25J 9/1687 |
| 2017/0151666 A1* | 6/2017 | Kobayashi | ............ | B25J 9/1633 |
| 2017/0282379 A1* | 10/2017 | Nakayama | .............. | B25J 15/10 |
| 2017/0312921 A1* | 11/2017 | Kobayashi | ............. | B25J 9/1687 |
| 2017/0348854 A1* | 12/2017 | Oleynik | ................. | A47J 47/02 |
| 2017/0371465 A1* | 12/2017 | Ahn | ..................... | G06F 3/041 |
| 2018/0021950 A1* | 1/2018 | Shimodaira | ........... | B25J 13/085 318/568.11 |
| 2018/0029221 A1* | 2/2018 | Tanaka | ................. | B25J 15/0433 |
| 2018/0029232 A1* | 2/2018 | Ouchi | ................... | B25J 9/1674 |
| 2018/0093379 A1* | 4/2018 | Shimodaira | ........... | B25J 9/1679 |

FOREIGN PATENT DOCUMENTS

| | | |
|---|---|---|
| CN | 107336255 | 11/2017 |
| JP | H1027659 | 1/1998 |

OTHER PUBLICATIONS

"Search Report of Europe Counterpart Application", dated Aug. 2, 2019, pp. 1-10.
"Office Action of China Counterpart Application", dated Apr. 23, 2020, with English translation thereof, p. 1-p. 11.

* cited by examiner

COMPONENT INSERTION DEVICE, COMPONENT INSERTION METHOD AND PROGRAM

CROSS-REFERENCE TO RELATED APPLICATION

This application claims the priority benefit of Japanese application serial no. 2018-042074, filed on Mar. 8, 2018. The entirety of the above-mentioned patent application is hereby incorporated by reference herein and made a part of this specification.

BACKGROUND

Technical Field

The disclosure relates to a component insertion device and a component insertion method, and more specifically, to a component insertion device and a component insertion method for inserting a workpiece into a receiving part having an elongated slot, wherein the workpiece has a flat plate shape to be fitted into the slot. The disclosure also relates to a program for causing a computer to execute the component insertion method.

Description of Related Art

For a typical case of inserting into a receiving part, which has an elongated slot, a workpiece having a flat plate shape to be fitted into the slot, for example, as disclosed in Patent Document 1 (JP H10-27659), there is a case of slidably inserting an FPC (Flexible Printed Circuit) having a flat plate shape into an FPC connector having a gap (slot) in an elongated straight shape.

Attempts have been made to automatically perform a process of slidably inserting an FPC into such an FPC connector (an FPC insertion process) with use of, for example, a robot.

However, regarding the FPC insertion process, it is true that mechanization and automation are not advanced due to the following reasons.

First, the contact search is difficult. Specifically, even if a force sensor is provided on the robot to bring the FPC into contact with the periphery of the slot of the FPC connector and search the position of the slot based on the contact reaction force received by the FPC, the FPC itself may be bent and undergo a large plastic deformation depending on the way of contact. Therefore, it is difficult to search the position of the slot based on the contact reaction force. In addition, when the FPC undergoes a large plastic deformation, there is a need to discard it.

Second, it takes a long takt time. Specifically, in order to avoid the breakage (including the plastic deformation) of the FPC, it is necessary to push the FPC slowly by a compliance control. At this time, it is necessary to set the pushing speed slow and to set the bite-solving operation (the operation for solving the phenomenon that the FPC is caught on the insertion opening by minutely vibrating the FPC) slow. As a result, it takes, for example, about 150 seconds to insert one FPC.

RELATED ART

Patent Document

[Patent Document 1] Japanese Laid-open No. H10-27659

SUMMARY

A component insertion device of the disclosure is a component insertion device for inserting a specific part of a workpiece into a receiving part having a slot in an elongated straight shape, the specific part of the workpiece has a flat plate shape to be fitted into the slot, characterized in including:

a robot; and a control part for controlling operations of the robot, wherein the robot has:

a gripper having a pair of claws capable of clamping the workpiece in a state where the specific part is protruded to outside; and a force sensor capable of detecting a contact reaction force received by the workpiece from a periphery of the slot of the receiving part via the gripper, the pair of claws has specific shapes for bending or flexing at least the specific part of the workpiece in a thickness direction when approaching each other to clamp the workpiece, and the control part includes a clamping processing part for performing a processing of making the pair of claws approach each other and clamp the workpiece in the state where the specific part is protruded to the outside while the pair of claws bend or flex the specific part in the thickness direction within a range of a transverse-direction dimension of the slot; and an insertion processing part for performing with the robot a processing of inserting the specific part of the workpiece clamped by the pair of claws into the slot of the receiving part along an insertion direction perpendicular to a tip end surface, which is formed by the specific part, by a compliance control based on an output of the force sensor.

In another aspect, a component insertion method of the disclosure is a component insertion method for inserting specific part of a workpiece into a receiving part having a slot in an elongated straight shape, the specific part of the workpiece has a flat plate shape to be fitted into the slot by the component insertion device, characterized in after performing the processing of making the pair of claws approach each other and clamp the workpiece in the state where the specific part is protruded to the outside while the pair of claws bend or flex the specific part in the thickness direction within the range of the transverse-direction dimension of the slot, performing with the robot the processing of inserting the specific part of the workpiece clamped by the pair of claws into the slot of the receiving part along the insertion direction perpendicular to the tip end surface, which is formed by the specific part, by the compliance control based on the output of the force sensor.

Further, in another aspect, a program of the disclosure is a program for causing a computer to execute the component insertion method.

The component insertion method can be implemented by executing the program of the disclosure by a computer.

Effects

As is apparent from the above description, according to the component insertion device and the component insertion method of the disclosure, it is possible to automatically insert into the receiving part, which has the slot in the elongated straight shape, the relatively soft object, which is the workpiece having the flat plate shape to be fitted into the slot, in a short time. Further, the above component insertion method can be implemented by executing the program of the disclosure by a computer.

BRIEF DESCRIPTION OF THE DRAWINGS

FIG. 2(A-1) is a diagram showing a pair of claws included in the gripper; FIG. 2(A-2) is a diagram showing an FPC bent in an arc shape by the pair of claws; FIG. 2(A-3) is a diagram schematically showing a state where the bent FPC is inserted into the slot.

FIG. 2(B-1) is a diagram showing a modified example of the pair of claws included in the gripper; FIG. 2(B-2) is a diagram showing an FPC bent in a wavy shape by the pair of claws; FIG. 2(B-3) is a diagram schematically showing a state where the bent FPC is inserted into the slot.

FIG. 2(C-1) is a diagram showing another modified example of the pair of claws included in the gripper; FIG. 2(C-2) is a diagram showing an FPC flexed by the pair of claws; FIG. 2(C-3) is a diagram schematically showing a state where the flexed FPC is inserted into the slot.

FIGS. 3(A-1), 3(A-2), and 3(A-3) are diagrams showing a state where a distance D between the pair of claws shown in FIG. 2(A-1) is variably set.

FIGS. 3(B-1), 3(B-2), and 3(B-3) are diagrams showing a state where an effective thickness dimension FP2eff at the tip end surface of the bent FPC changes according to the distance D between the pair of claws.

(A) to (F) of FIG. 8 are diagrams showing a specific procedure of inserting the end part of the FPC into the slot of the FPC connector by a compliance control based on an output of the force sensor.

DESCRIPTION OF THE EMBODIMENTS

A subject of the disclosure is to provide a component insertion device and a component insertion method capable of automatically inserting into a receiving part, which has a slot in an elongated straight shape, a relatively soft object, which is a workpiece having a flat plate shape to be fitted into the slot, in a short time. Further, a subject of the disclosure is to provide a program for causing a computer to execute the component insertion method.

A component insertion device of the disclosure is a component insertion device for inserting a specific part of a workpiece into a receiving part having a slot in an elongated straight shape, the specific part of the workpiece has a flat plate shape to be fitted into the slot, characterized in including:

a robot; and a control part for controlling operations of the robot, wherein the robot has:

a gripper having a pair of claws capable of clamping the workpiece in a state where the specific part is protruded to outside; and a force sensor capable of detecting a contact reaction force received by the workpiece from a periphery of the slot of the receiving part via the gripper, the pair of claws has specific shapes for bending or flexing at least the specific part of the workpiece in a thickness direction when approaching each other to clamp the workpiece, and the control part includes a clamping processing part for performing a processing of making the pair of claws approach each other and clamp the workpiece in the state where the specific part is protruded to the outside while the pair of claws bend or flex the specific part in the thickness direction within a range of a transverse-direction dimension of the slot; and an insertion processing part for performing with the robot a processing of inserting the specific part of the workpiece clamped by the pair of claws into the slot of the receiving part along an insertion direction perpendicular to a tip end surface, which is formed by the specific part, by a compliance control based on an output of the force sensor.

In this specification, the "specific part" of the workpiece corresponds to the part inserted into the slot or a hole. Therefore, it is sufficient that the "specific part" has a flat plate shape to be fitted into the slot or a hole. The "specific part" is not limited to the end part but may refer to other parts.

In addition, in fact, a relatively soft object which has difficulty measuring the contact reaction force by the force sensor if it maintains the flat plate shape is targeted as the specific part of the workpiece. The reason is that if the workpiece can measure the contact reaction force by the force sensor even if it maintains the flat plate shape, there is no need to bend or flex the specific part of the workpiece in the thickness direction, but the specific part of the workpiece may be inserted into the slot of the receiving part by the compliance control while maintaining the flat plate shape.

Further, the "transverse-direction dimension" of the slot is set to be larger than a thickness dimension of the workpiece by a predetermined clearance dimension.

Further, the "tip end surface" formed by the specific part refers to a surface corresponding to the tip end of the specific part. The tip end surface is considered to be substantially forming a certain plane in a case where the workpiece is in the flat plate shape (the original shape) and in a case where the specific part is bent or flexed in the thickness direction.

In the component insertion device of the disclosure, a pair of claws included in the gripper of the robot has specific shapes for bending or flexing at least the specific part of the workpiece in the thickness direction when approaching each other to clamp the workpiece. A clamping processing part of the control part performs a processing of making the pair of claws approach each other and clamp the workpiece in the state where the specific part is protruded to the outside while the pair of claws bend or flex the specific part in the thickness direction within a range of a transverse-direction dimension of the slot. In this way, the strength (the substantial hardness) of the workpiece, with respect to the insertion direction perpendicular to the tip end surface formed by the specific part, increases. Next, an insertion processing part performs with the robot a processing of inserting the specific part of the workpiece clamped by the pair of claws into the slot of the receiving part along the insertion direction perpendicular to the tip end surface, which is formed by the specific part, by a compliance control based on an output of the force sensor. At this time, although the compliance control is performed, since the strength of the specific part of the workpiece increases, the insertion can be completed in a relatively short time (about 20 seconds to 30 seconds, for example). Further, since the strength of the specific part of the workpiece increases, the workpiece can be prevented from undergoing a large plastic deformation. Therefore, according to the component insertion device, it is possible to automatically insert into the receiving part, which has the slot in the elongated straight shape, the relatively soft object, which is the workpiece having the flat plate shape (the original shape) to be fitted into the slot, in a short time.

The component insertion device according to one embodiment is characterized in including an imaging part for imaging the tip end surface, which is bent or flexed in the thickness direction, of the workpiece clamped by the pair of claws, wherein the control part has a dimension obtaining part for calculating an effective thickness dimension at the tip end surface of the workpiece based on an image of the tip end surface obtained by the imaging part, and the clamping processing part variably sets a distance between the pair of claws based on the effective thickness dimension at the tip end surface so that the effective thickness dimension is less than the transverse-direction dimension of the slot.

In this specification, the "effective thickness dimension" means the distance with respect to the thickness direction formed by an external tangent line to one contour line on the tip end surface and an external tangent line to another contour line on the tip end surface.

In the component insertion device according to the present embodiment, the imaging part images the tip end surface, which is bent or flexed in the thickness direction, of the workpiece clamped by the pair of claws. The dimension obtaining part of the control part calculates the effective thickness dimension at the tip end surface of the workpiece. The clamping processing part variably sets a distance between the pair of claws based on the effective thickness dimension at the tip end surface so that the effective thickness dimension is less than the transverse-direction dimension of the slot. In this way, the tip end surface (thus the end part) of the workpiece has the dimension that can be inserted into the slot.

In another aspect, a component insertion method of the disclosure is a component insertion method for inserting specific part of a workpiece into a receiving part having a slot in an elongated straight shape, the specific part of the workpiece has a flat plate shape to be fitted into the slot by the component insertion device, characterized in after performing the processing of making the pair of claws approach each other and clamp the workpiece in the state where the specific part is protruded to the outside while the pair of claws bend or flex the specific part in the thickness direction within the range of the transverse-direction dimension of the slot, performing with the robot the processing of inserting the specific part of the workpiece clamped by the pair of claws into the slot of the receiving part along the insertion direction perpendicular to the tip end surface, which is formed by the specific part, by the compliance control based on the output of the force sensor.

According to the component insertion method of the disclosure, it is possible to automatically insert into the receiving part, which has the slot in the elongated straight shape, the relatively soft object, which is the workpiece having the flat plate shape (the original shape) to be fitted into the slot, in a short time.

Further, in another aspect, a program of the disclosure is a program for causing a computer to execute the component insertion method.

The component insertion method can be implemented by executing the program of the disclosure by a computer.

Effects

As is apparent from the above description, according to the component insertion device and the component insertion method of the disclosure, it is possible to automatically insert into the receiving part, which has the slot in the elongated straight shape, the relatively soft object, which is the workpiece having the flat plate shape to be fitted into the slot, in a short time. Further, the above component insertion method can be implemented by executing the program of the disclosure by a computer.

Hereinafter, embodiments of the disclosure will be described in detail with reference to the drawings.

Figure 1A:
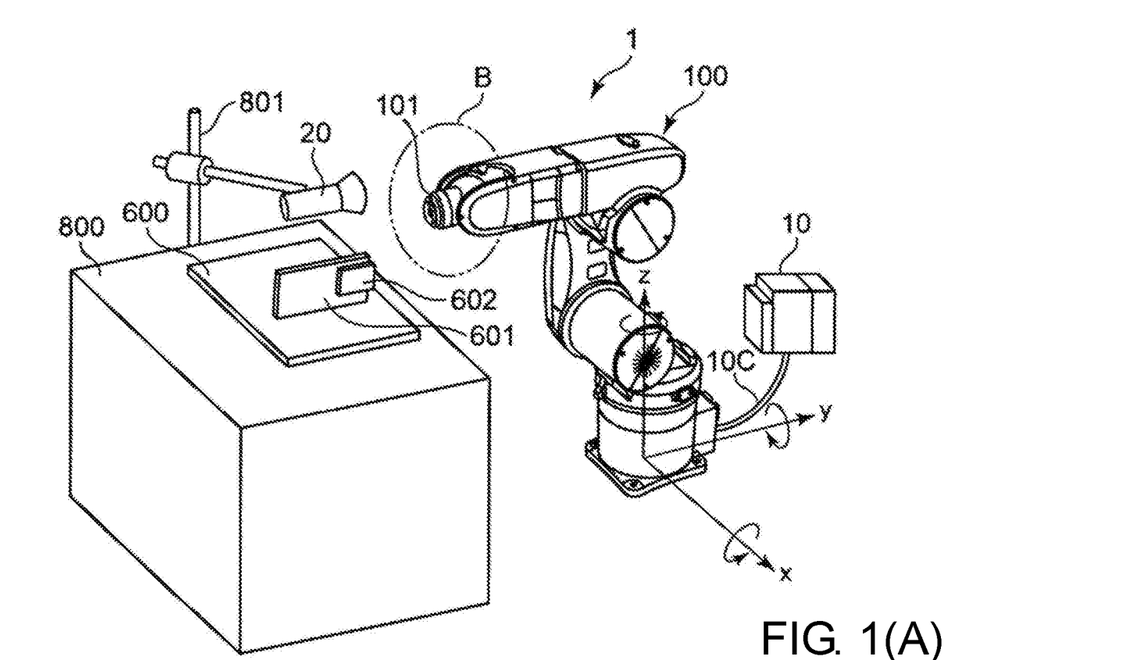
FIG. 1(A) is a perspective diagram schematically showing an appearance of a component insertion device according to an embodiment of the disclosure.

FIG. 1(A) schematically shows an appearance of a component insertion device 1 according to an embodiment of the disclosure. The component insertion device 1 in this example includes a robot 100 disposed in the vicinity of an assembly platform 800, a controller 10 for controlling operations of the robot 100, and a camera 20 as an imaging part.

Figure 1B:
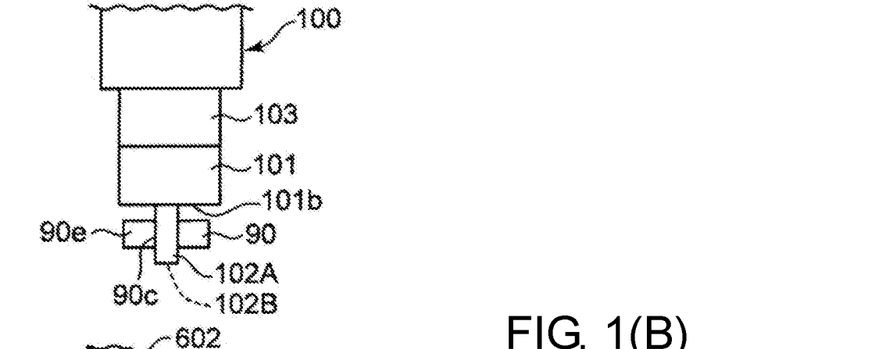
FIG. 1(B) is a diagram showing a side view of the vicinity part of a gripper of a robot configuring the component insertion device.
Figure 1C:
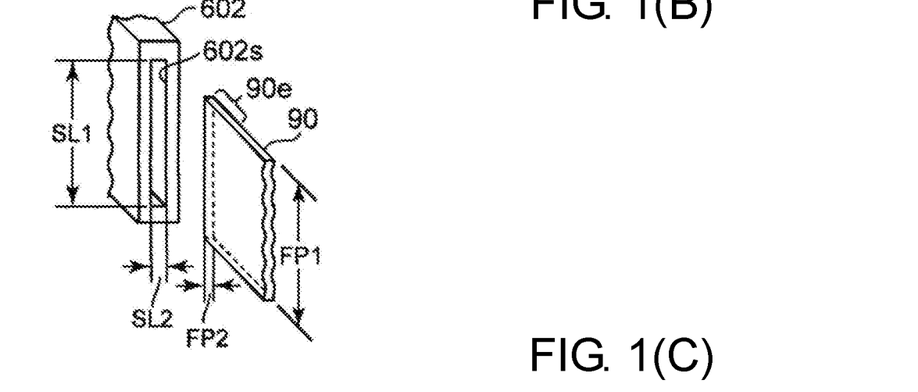
FIG. 1(C) is a diagram showing an FPC connector, which has a slot in an elongated straight shape, and an FPC having a flat plate shape (an original shape) to be fitted into the slot.

In this example, the assembly platform 800 is disposed within a movable range of the robot 100. An object which is installed with a circuit board 601 having an FPC (Flexible Printed Circuit) connector 602, which serves as a receiving part, is placed on the assembly platform 800 as a work-in-process 600 (the work-in-process 600 may be fixed on the assembly platform 800 by elements not shown). The camera 20 is held above the FPC connector 602 by an arm-possessing stand 801 in a posture with a field of view facing the robot 100. As shown in FIG. 1(C), the FPC connector 602 has a slot 602s in an elongated straight shape. The component insertion device 1 is a device for automatically inserting an end part 90e serving as a specific part of an FPC 90, which has a rectangular flat plate shape and serves as a workpiece, into the slot 602s of the FPC connector 602. A longitudinal-direction dimension SL1 and a transverse-direction dimension SL2 of an opening of the slot 602s are set to be respectively greater than a longitudinal-direction dimension FP1 (3 cm in this example) and a transverse-direction dimension FP2 (0.20 mm in this example) of the end part 90e of the FPC 90 by a certain clearance dimension and, in this example, are set as SL1=3.2 cm and SL2=2 mm. A depth of the slot 602s (that is, an insertion depth of the FPC 90) is set to 5 mm in this example. Further, the transverse-direction dimension SL2 of the slot 602s may gradually decrease (narrow) as the depth in the slot 602s becomes deeper.

The robot 100 in this example is configured by a six-axis (six control axis) articulated robot having a gripper 101. The robot 100 has three axes of x (an x-axis position), y (a y-axis position), and z (a z-axis position) representing degrees of freedom of translation and three axes of yaw (a yaw angle), pitch (a pitch angle), and roll (a roll angle) representing degrees of freedom of rotation. FIG. 1(B) shows the vicinity part of the gripper 101 in FIG. 1(A) (the part surrounded by the two-dot chain line B). As shown in FIG. 1(B), the gripper 101 in this example has a pair of claws 102A and 102B capable of clamping the FPC 90. The pair of claws 102A and 102B protrude from a tip end surface 101b of the gripper 101 to the outside in an elongated way. In addition, in FIG. 1(B), the claw 102B is disposed hidden behind the claw 102A. In this example, the gripper 101 can adjust a distance between the pair of claws 102A and 102B by making the pair of claws 102A and 102B slide in a direction to approach each other or reversely in a direction to separate from each other by servo control (the gripper 101 can also adjust the clamping force). The end part 90e of the FPC 90 becomes protruding to the outside when the claws 102A and 102B of the gripper 101 hold the FPC 90 at its central part 90c.

In this example, the dimensions of the FPC 90 in the rectangular flat plate shape are set as 7 cm in total length, 3 cm in width (=FP1), and 0.20 mm in thickness (=FP2). In a state where the central part 90c of the FPC 90 is held by the claws 102A and 102B of the gripper 101, the end part 90e of the FPC 90 protrudes by about 3 cm to the outside (the lateral side in this example) of the claws 102A and 102B of the gripper 101 and bends (or flexes) in a thickness direction as described below.

The FPC 90 is a known FPC and is configured by providing a conductor foil (such as a copper foil) on a relatively soft base material such as polyimide via an adhesive layer (such as an epoxy thermosetting adhesive).

Further, a force sensor 103 is installed on a part of the robot 100 in the vicinity of the gripper 101. The force sensor 103 can detect a contact reaction force received by the FPC 90 from the periphery of the slot 602s of the FPC connector 602 via the gripper 101 during a processing (Step S4 in FIG. 6) to be described below.

Figure 2:
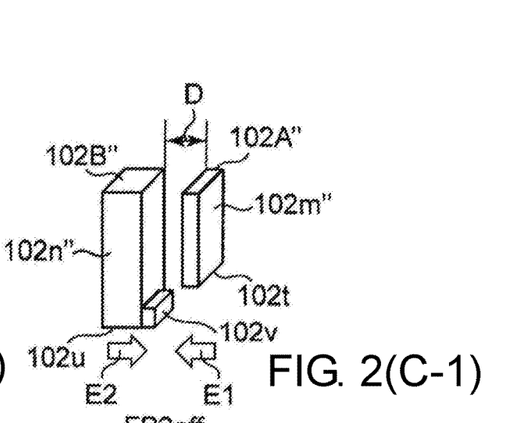

FIG. 2(A-1) shows the pair of claws 102A and 102B included in the gripper 101 when viewed from an oblique angle. In this example, the one claw 102A has a main part 102m in a quadrangular prism shape and a protruding part 102p, which serves as a specific shape protruding from the main part 102m toward the other claw 102B in a semi-cylindrical shape (the radius is 2.0 cm in this example). The protruding part 102p is disposed at a central part of the main part 102m in the longitudinal direction and extends in a direction intersecting the longitudinal direction of the main part 102m. The other claw 102B has a main part 102n, which is in a quadrangular prism shape extending parallel to the main part 102m of the one claw 102A, and a recess part 102q, which is formed in the main part 102n at a part corresponding to the protruding part 102p of the one claw 102A and serves as a specific shape recessed in a semi-cylindrical shape so as to receive the protruding part 102p. When the FPC 90 is disposed between the pair of claws 102A and 102B and the distance D between the main parts 102m and 102n of the pair of claws 102A and 102B is made to approach each other as indicated by the arrows E1 and E2, the central part 90c of the FPC 90 is clamped between the protruding part 102p and the recess part 102q, and the FPC 90 and also the end part 90e bend in an arc shape in a thickness direction E, as shown in FIG. 2(A-2). In this way, an effective thickness dimension FP2eff at a tip end surface 90p formed by the end part 90e increases. Here, the effective thickness dimension FP2eff means the distance with respect to the thickness direction E formed by an external tangent line cu1 to one contour line (the contour line on the right side in FIG. 2(A-2) in this example) 90p1 on the tip end surface 90p and an external tangent line cu2 to another contour line (the contour line on the left side in FIG. 2(A-2) in this example) 90p2 on the tip end surface 90p. In this example, as shown in FIG. 2(A-3), it is predetermined that the end part 90e of the FPC 90 clamped by the pair of claws 102A and 102B is inserted into the slot 602s of the FPC connector 602 along an insertion direction P4 perpendicular to the tip end surface 90p formed by the end part 90e (to be described in detail below).

Figure 3:
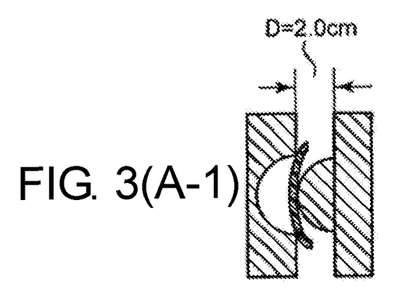
Figure 4:
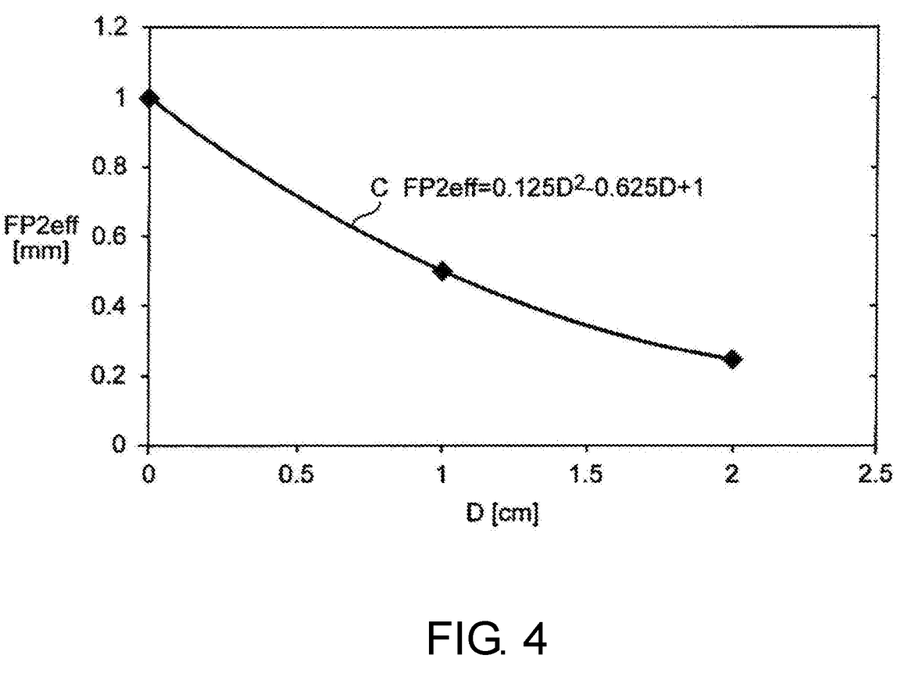
FIG. 4 is a diagram showing in a graph a relationship between the distance D between the pair of claws and the effective thickness dimension FP2eff at the tip end surface of the bent FPC.

FIGS. 3(A-1), 3(A-2), and 3(A-3) show a state where the distance D between the main parts 102m and 102n of the pair of claws 102A and 102B shown in FIG. 2(A-1) is sequentially variably set to 2.0 cm, 1.0 cm, and 0.0 cm in this example. As shown in FIGS. 3(B-1), 3(B-2), and 3(B-3), the effective thickness dimension FP2eff at the tip end surface 90p of the bent FPC 90, in this example, sequentially changes to 0.25 mm, 0.5 mm, and 1.0 mm according to the distance D between the main parts 102m and 102n of the pair of claws 102A and 102B. The relationship between the distance D (unit: cm) between the main parts 102m and 102n of the pair of claws 102A and 102B and the effective thickness dimension FP2eff (unit: mm) at the tip end surface 90p of the bent FPC 90 can be approximated by a quadratic curve C, as shown in FIG. 4. This quadratic curve C is obtained through experiments conducted by the inventors, and in this example, $$FP2\text{eff}=0.125D^2-0.625D+1 \quad \text{(Eq. 1)}$$

is obtained. In this way, by variably setting the distance D between the main parts 102m and 102n of the pair of claws 102A and 102B, the effective thickness dimension FP2eff at the tip end surface 90p of the FPC 90 can be adjusted.

Figure 5:
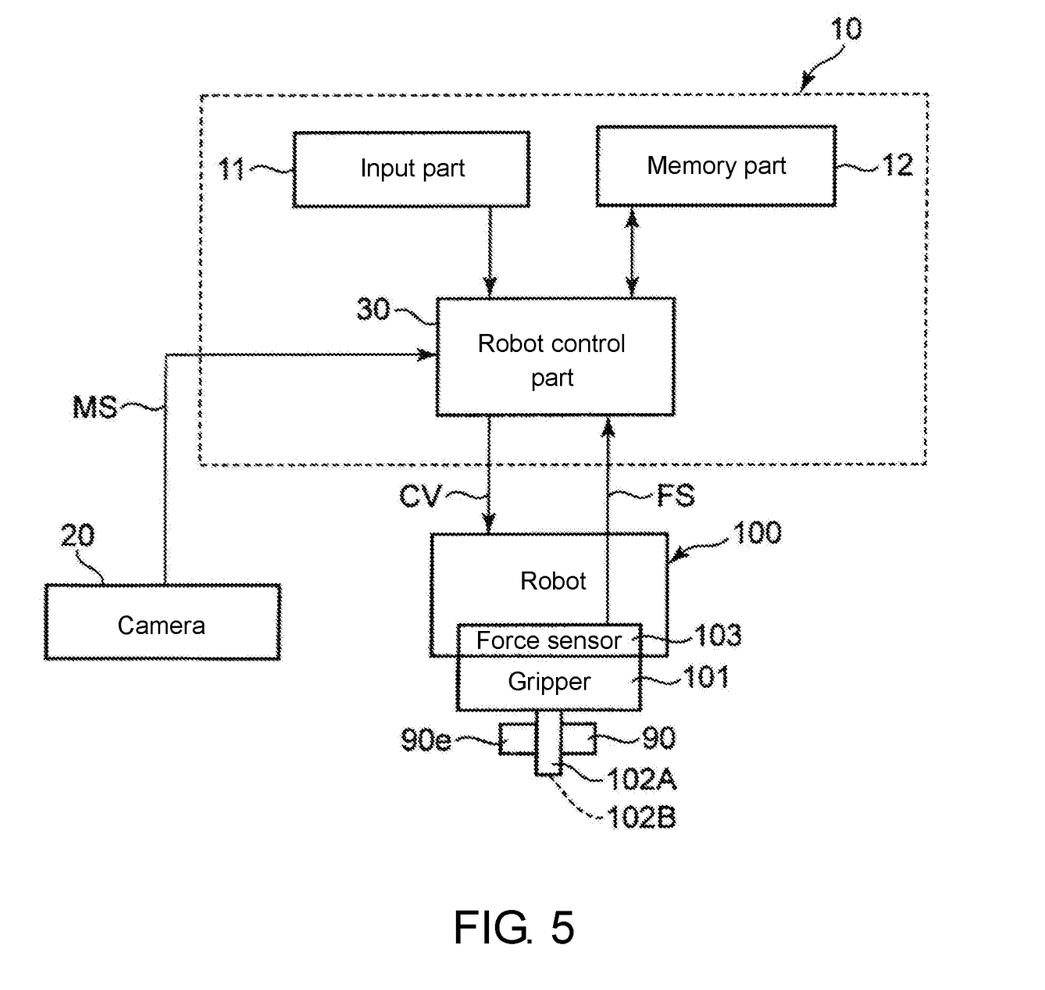
FIG. 5 is a diagram showing a block configuration of a control system of the component insertion device.

As shown in FIG. 5, the controller 10 in this example includes an input part 11, a memory part 12, and a robot control part 30.

The input part 11 in this example is configured by a teaching pendant. In this example, the input part 11 is used, in particular, for the user to input a processing start command.

The memory part 12 in this example is configured by a nonvolatile semiconductor memory. In this example, the memory part 12, in particular, stores an image photographed by the camera 20 during the processing (Step S2 in FIG. 6) to be described below.

The robot control part 30 in this example is configured by a processor that operates in accordance with a robot control program stored in the memory part 12. The robot control part 30 controls the six-axis robot 100 by using control information CV formed by six elements equal to the number of the axes. The control information CV includes three elements of x (the x-axis position), y (the y-axis position), and z (the z-axis position) representing the degrees of freedom of translation and three elements of yaw (a yaw angle value), pitch (a pitch angle value), and roll (a roll angle value) representing the degrees of freedom of rotation. In a normal position control, the value of each of the elements of the control information CV is respectively sequentially updated at constant intervals, whereby each of the axes of the robot 100 is respectively driven.

Further, in this example, the robot control part 30 can receive an output signal FS of the force sensor 103 regarding the robot 100 and perform the compliance control (the control for causing the robot to move gently by using the position and posture of the tip of the robot and the force applied to the tip of the robot). In the compliance control, for example, the operation of the robot 100 is feedback-controlled so that the force component in directions (the x direction and the z direction) intersecting (orthogonal to) the insertion direction (the −y direction, for example) detected by the force sensor 103 decreases.

Transmission and reception of the control information CV and the output signal FS of the force sensor 103 between the controller 10 and the robot 100 are performed via a cable 10C shown in FIG. 1(A).

Further, in this example, the robot control part 30 receives a signal MS representing the image photographed by the camera 20 through wireless communication or via a cable (not shown).

The camera 20 photographs the tip end surface 90p, which is bent or flexed in the thickness direction E, of the FPC 90 clamped by the pair of claws 102A and 102B during the processing (Step S2 in FIG. 6) to be described below and outputs the signal MS representing the obtained image to the robot control part 30.

Figure 6:
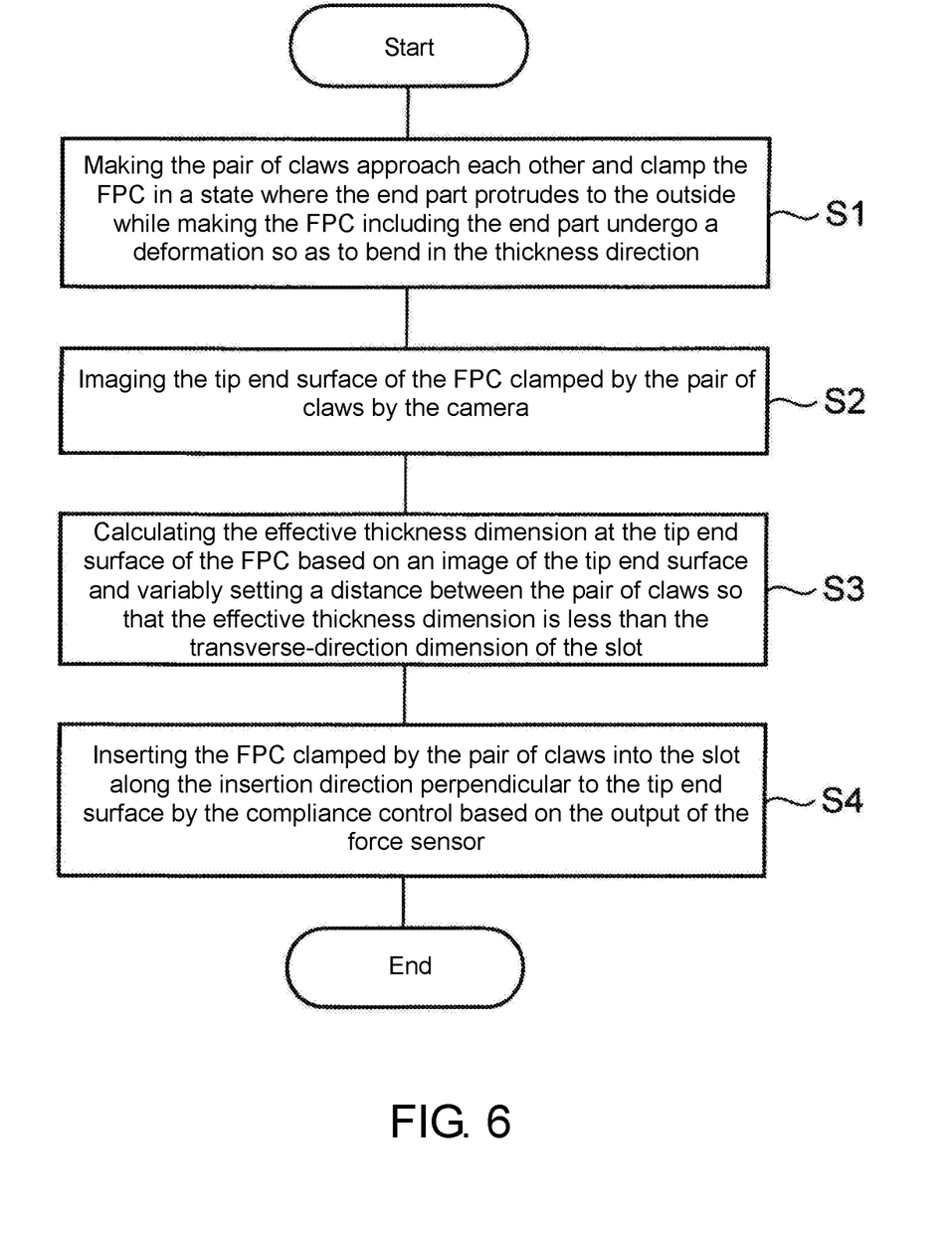
FIG. 6 is a diagram showing a flow of a processing of automatically inserting the end part of the FPC into the slot of the FPC connector by the component insertion device.

FIG. 6 shows an operation flow of a component insertion method of one embodiment performed by the component insertion device 1 described above. Next, with reference to FIGS. 7A to 7D (viewed from the +x direction in FIG. 1(A)) together, a processing of automatically inserting the end part 90e of the FPC 90 into the slot 602s of the FPC connector 602 is described.

Figure 7A:
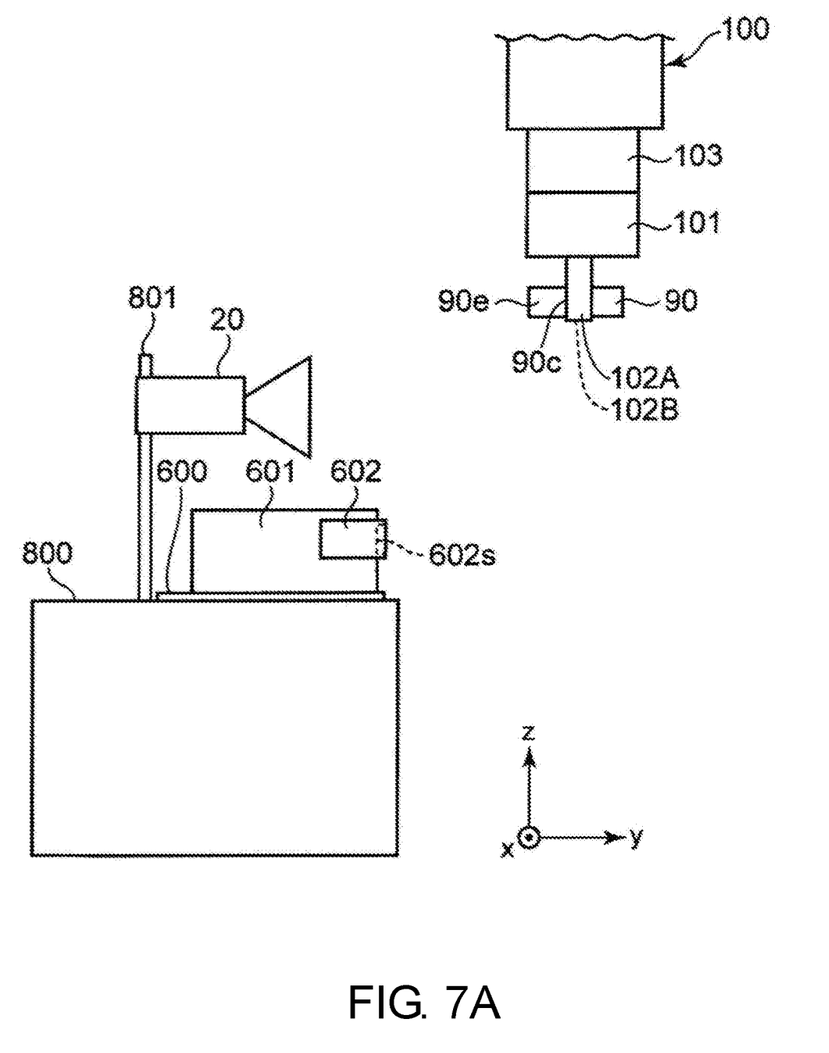
FIG. 7A is a diagram schematically showing a part of the process of automatically inserting the end part of the FPC into the slot of the FPC connector.

As shown in FIG. 7A, it is assumed that the work-in-process 600 including the FPC connector 602 is placed on the assembly platform 800 in advance. The camera 20 is held above the FPC connector 602 by the arm-possessing stand 801 in a posture with the field of view facing the robot 100 in the +y direction. At this time, in this example, the gripper 101 of the robot 100 exists at a position distant from the assembly platform 800.

When the user inputs the processing start command with the input part 11, first, as shown in Step S1 in FIG. 6, the robot control part 30 of the controller 10 works as a clamping processing part and makes the pair of claws 102A and 102B of the gripper 101 of the robot 100 approach each other and clamp the FPC 90 in a state where the end part 90e protrudes to the outside, as shown in FIG. 7A, while bending (in an arc shape in this example) the FPC 90 and also the end part 90e in the thickness direction E as shown in FIG. 2(A-2). In this way, the strength (the substantial hardness) of the FPC 90, with respect to the insertion direction (the −y direction in this example) perpendicular to the tip end surface 90p formed by the end part 90e, increases. In the circumstance of FIG. 7A, the end part 90e of the FPC 90 faces the −y direction with the robot 100 as the reference.

Figure 7B:
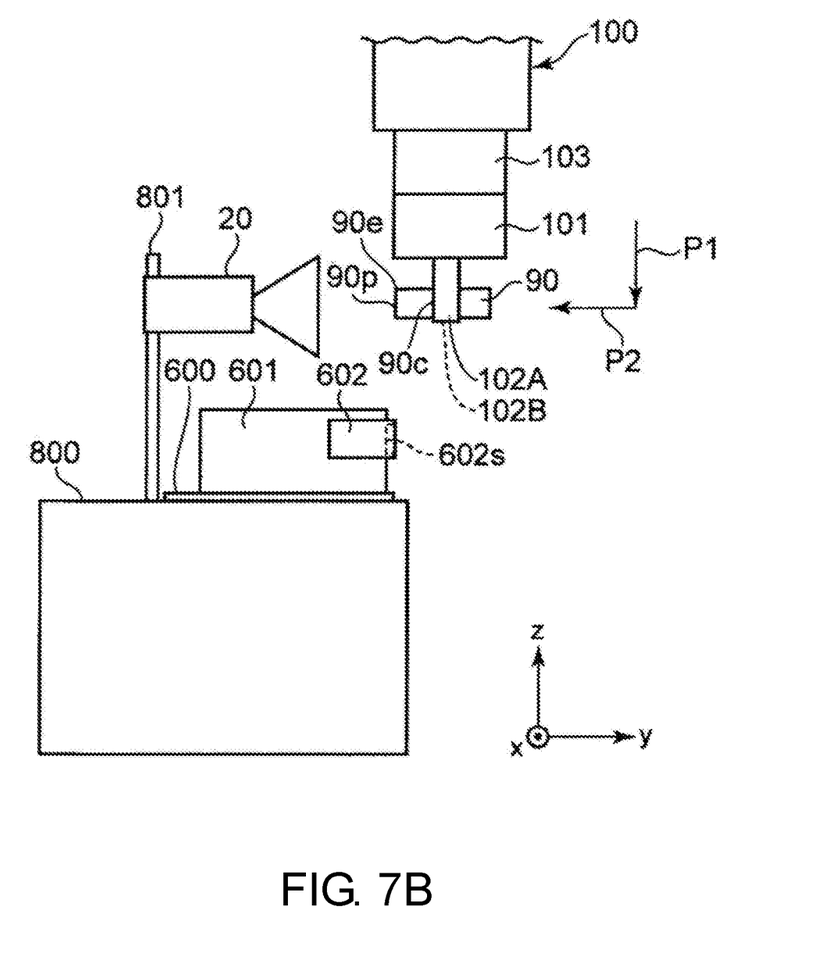
FIG. 7B is a diagram schematically showing a part of the process of automatically inserting the end part of the FPC into the slot of the FPC connector.
Figure 7C:
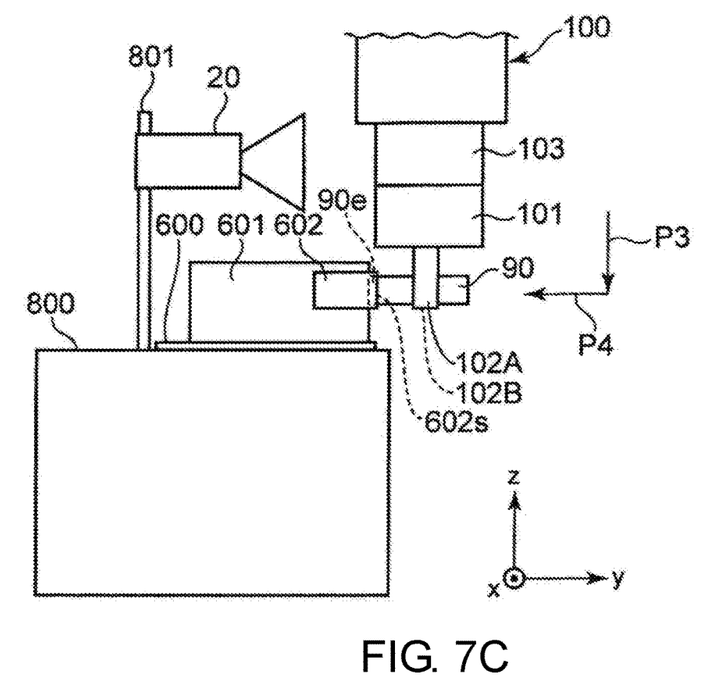
FIG. 7C is a diagram schematically showing a part of the process of automatically inserting the end part of the FPC into the slot of the FPC connector.
Figure 7D:
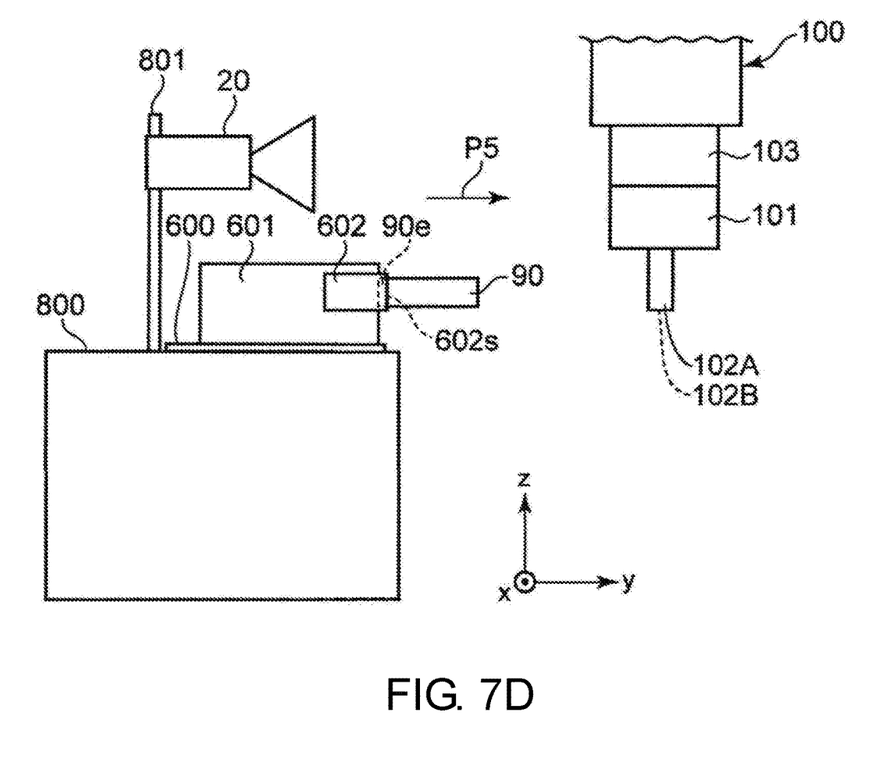
FIG. 7D is a diagram schematically showing a part of the process of automatically inserting the end part of the FPC into the slot of the FPC connector.

Next, the robot control part 30 moves the robot 100 as indicated by the arrows P1 and P2 in FIG. 7B and moves the FPC 90 clamped by the pair of claws 102A and 102B toward the camera 20 while maintaining the posture in which the end part 90e (that is, the tip end surface 90p) faces the −y direction. In this circumstance, as shown in Step S2 in FIG. 6, the camera 20 photographs the tip end surface 90p, which is bent in the thickness direction E, of the FPC 90 clamped by the pair of claws 102A and 102B (with reference to FIG. 2(A-2)) and outputs the signal MS representing the obtained image to the robot control part 30. The robot control part 30 makes the memory part 12 temporarily store the image photographed by the camera 20 (the image representing the tip end surface 90p, which is bent or flexed in the thickness direction E, of the FPC 90).

Next, as shown in Step S3 in FIG. 6, the robot control part 30 works as a dimension obtaining part and calculates the effective thickness dimension FP2eff at the tip end surface 90p of the FPC 90 based on the image of the tip end surface 90p obtained by the camera 20. Specifically, for example, as shown in FIG. 2(A-2), the robot control part 30 sets the external tangent line cu1 to the one contour line 90p1 and the external tangent line cu2 to another contour line 90p2 with respect to the thickness direction E on the image of the tip end surface 90p of the FPC 90 and calculates a distance between the external tangent lines cu1 and cu2. Subsequently, the robot control part 30 works as a clamping processing part and variably sets the distance D between the pair of claws 102A and 102B based on the effective thickness dimension FP2eff at the tip end surface 90p so that the effective thickness dimension FP2eff is less than the transverse-direction dimension SL2 of the slot 602s. As a result, the effective thickness dimension FP2eff at the tip end surface 90p of the FPC 90 falls within the range of the transverse-direction dimension SL2 of the slot 602s shown in FIG. 2(A-3), and the tip end surface 90p (thus the end part 90e) of the FPC 90 has the dimension that can be inserted into the slot 602s.

Next, as shown in Step S4 in FIG. 6, the robot control part 30 works as an insertion processing part and performs with the robot 100 a processing of inserting the end part 90e of the FPC 90 clamped by the pair of claws 102A and 102B into the slot 602s of the FPC connector 602 along the insertion direction (the −y direction in this example) perpendicular to the tip end surface 90p formed by the end part 90e by the compliance control based on the output of the force sensor 103. In this way, as indicated by the arrows P3 and P4 in FIG. 7C, the end part 90e of the FPC 90 is inserted into the slot 602s of the FPC connector 602 (the arrow P4 faces the −y direction in this example). At this time, although the compliance control is performed, since the strength of the end part 90e of the FPC 90 increases, the insertion can be completed in a relatively short time (about 20 seconds to 30 seconds, for example). Further, since the strength of the end part 90e of the FPC 90 increases, the FPC 90 can be prevented from undergoing a large plastic deformation.

Figure 8:
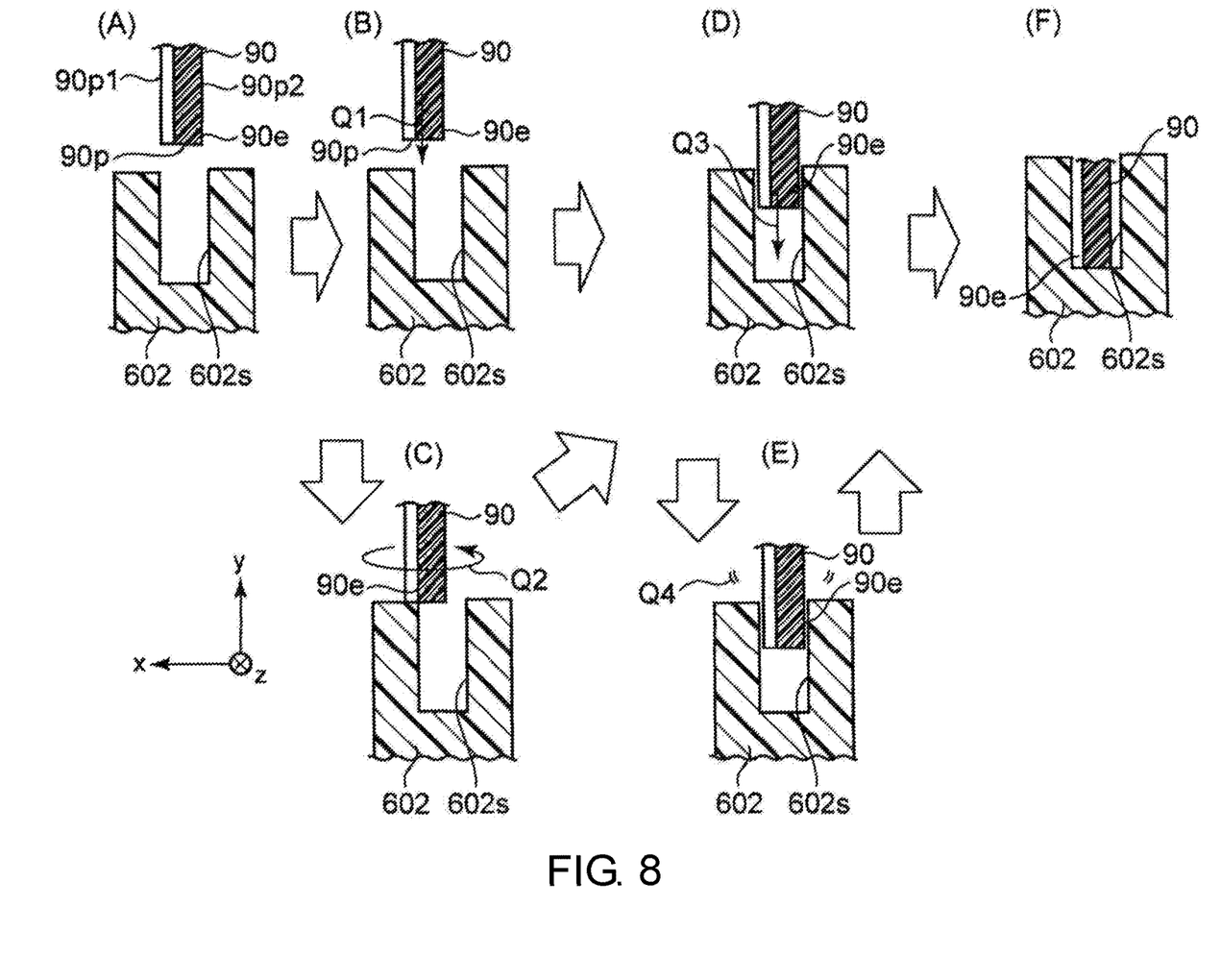

Here, the processing of inserting by the compliance control is specifically performed in the following procedure starting from the circumstance of (A) of FIG. 8. First, as shown by the arrow Q1 in (B) of FIG. 8, the end part 90e (the tip end surface 90p) of the FPC 90 is brought to abut the periphery (the vicinity of the opening) of the slot 602s of the FPC connector 602 (an abutting operation). Next, as shown by the arrow Q2 in (C) of FIG. 8, the position of the opening of the slot 602s is searched with the end part 90e of the FPC 90 (a searching operation). After finding the position of the opening of the slot 602s, as shown by the arrow Q3 in (D) of FIG. 8, the end part 90e of the FPC 90 is pushed to the vicinity of the entrance of the slot 602s of the FPC connector 602 (a pushing operation). During the pushing, as shown by the sign Q4 in (E) of FIG. 8, the end part 90e of the FPC 90 is made minutely vibrate to solve the biting (the phenomenon of being caught on the entrance of the slot 602s) (a bite-solving operation). In this way, as shown in (F) of FIG. 8, the end part 90e of the FPC 90 is inserted into the slot 602s of the FPC connector 602. The shape of the end part 90e of the FPC 90 inserted into the slot 602s returns to its original flat plate shape along the straight shape of the slot 602s.

Thereafter, the pair of claws 102A and 102B of the gripper 101 of the robot 100 are opened to release the FPC 90. Then, as indicated by the arrow P5 in FIG. 7D, the robot 100 moves backward from the assembly platform 800 in the leaving direction (the +y direction).

As described above, according to the component insertion device 1, it is possible to automatically insert into the FPC connector 602, which has the slot 602s in the elongated straight shape, the relatively soft object, which is the FPC 90 having the flat plate shape (the original shape) to be fitted, into the slot 602s.

Further, the gripper 101 has a stopper (not shown) for preventing the clamped FPC 90 from being misaligned with respect to the pair of claws 102A and 102B. Therefore, even if the distance D between the pair of claws 102A and 102B is temporarily set to be relatively large in Step S3 in FIG. 6, during the processing of inserting the end part 90e of the FPC 90 into the slot 602s (Step S4 in FIG. 6), the FPC 90 is not misaligned with respect to the pair of claws 102A and 102B.

Modified Example

In the above example, during the processing (Step S1 in FIG. 6) of clamping the central part 90c of the FPC 90 with the pair of claws 102A and 102B of the gripper 101 of the robot 100, the FPC 90 and also the end part 90e are bent in an arc shape in the thickness direction E. However, the disclosure is not limited thereto. For example, FIG. 2(B-1) shows a modified example (indicated by the reference numerals 102A' and 102B') of the pair of claws 102A and 102B included in the gripper 101. In this example, the one claw 102A' has a main part 102m' in a quadrangular prism shape and a horizontal rod part 102r, which serves as a specific shape protruding from the main part 102m' toward the lateral side (the front side in FIG. 2(B-1)) in a cylindrical shape (the radius is 1.4 cm in this example). The horizontal rod part 102r is disposed at a central part of the main part 102m' in the longitudinal direction and extends in a direction intersecting the longitudinal direction of the main part 102m'. The other claw 102B' has a main part 102n', which is in a quadrangular prism shape extending parallel to the main part 102m' of the one claw 102A', and horizontal rod parts 102s1 and 102s2, which serve as a specific shape protruding from the main part 102n' toward the lateral side (the front side in FIG. 2(B-1)) in cylindrical shapes (the radius is 1.4 cm in this example). The horizontal rod parts 102s1 and 102s2 are formed among the main part 102n' at parts corresponding to the uppermost part and the lowermost part of the horizontal rod part 102r of the one claw 102A' with respect to the height direction and extend parallel to the horizontal rod part 102r, respectively. When the FPC 90 is disposed between the pair of claws 102A' and 102B' and the distance D between the main parts 102m' and 102n' of the pair of claws 102A' and 102B' is made to approach each other as indicated by the arrows E1 and E2, the central part 90c of the FPC 90 is clamped between the main parts 102m' and 102n, and the end part 90e of the FPC 90 is clamped between the horizontal rod part 102r and the horizontal rod parts 102s1 and 102s2, and the end part 90e of the FPC 90 bends in a wavy shape in the thickness direction E as shown in FIG. 2(B-2). In this way, the effective thickness dimension FP2eff at the tip end surface 90p formed by the end part 90e increases. Therefore, as shown in FIG. 2(B-3), when the end part 90e of the FPC 90 clamped by the pair of claws 102A' and 102B' is inserted into the slot 602s of the FPC connector 602 along the insertion direction P4 perpendicular to the tip end surface 90p formed by the end part 90e, the insertion can be completed in a relatively short time as in the above-described example. Further, since the strength of the end part 90e of the FPC 90 increases, the FPC 90 can be prevented from undergoing a large plastic deformation.

Further, FIG. 2(C-1) shows a modified example (indicated by the reference numerals 102A" and 102B") of the pair of claws 102A and 102B included in the gripper 101. In this example, the one claw 102A" has a main part 102m" in a rectangular flat plate shape. In FIG. 2(C-1), a lower end 102t, which serves as a specific shape of the main part 102m", is located above a lower end 102u of the other claw 102B". The other claw 102B" has a main part 102n", which is in a quadrangular prism shape extending parallel to the main part 102m" of the one claw 102A", and a protruding part 102v, which serves as a specific shape formed on the lower end 102u of the main part 102n" and protruding from below the lower end 102t of the one claw 102A" toward the side of the one claw 102A" (the right side in FIG. 2(C-1)). When the FPC 90 is disposed between the pair of claws 102A" and 102B" and the distance D between the main parts 102m" and 102n" of the pair of claws 102A" and 102B" is made to approach each other as indicated by the arrows E1 and E2, the FPC 90 is clamped between the main parts 102m" and 102n", and the FPC 90 and also a corner part 90e1 of the end part 90e flex in the thickness direction E as shown in FIG. 2(C-2). In this way, the effective thickness dimension FP2eff at the tip end surface 90p formed by the end part 90e increases. Therefore, as shown in FIG. 2(C-3), when the end part 90e of the FPC 90 clamped by the pair of claws 102A" and 102B" is inserted into the slot 602s of the FPC connector 602 along the insertion direction P4 perpendicular to the tip end surface 90p formed by the end part 90e, the insertion can be completed in a relatively short time as in the above-described examples. Further, since the strength of the end part 90e of the FPC 90 increases, the FPC 90 can be prevented from undergoing a large plastic deformation.

As described above, the specific shapes of the pair of claws 102A and 102B of the gripper 101 may take various shapes as long as they can increase the effective thickness dimension FP2eff at the tip end surface 90p formed by the end part 90e of the FPC 90 within the range of the transverse-direction dimension SL2 of the slot 602s.

In the above examples, the receiving part (the FPC connector 602 included in the work-in-process 600) having the slot or the hole is placed on the assembly platform 800, but the disclosure is not limited thereto. The receiving part having the slot or the hole may be conveyed into the movable range of the robot 100 by, for example, a belt conveyor, and may be maintained in the disposition with respect to the robot 100 during the above-described processings (Steps S1 to S4 in FIG. 6).

Further, regarding a combination of a receiving part, which has a slot or a hole in an elongated straight shape, and a workpiece, which has a flat plate shape to be fitted into the slot or the hole, it is not limited to the example of the combination of the FPC connector 602 and the FPC 90 described above but may have various combinations.

The robot control part 30 of the controller 10 is configured by a processor that operates in accordance with a program. Further, the memory part 12 is configured by a memory device such as a nonvolatile semiconductor memory. That is, the robot control part 30 and the memory part 12 may be substantially configured by a computer device (such as a programmable logic controller (PLC)). Therefore, it is desirable that the component insertion method described with reference to FIG. 6 is configured as programs to be executed by a computer. In addition, it is desirable that the programs are recorded on a computer readable non-transitory recording medium. In that case, by causing the computer device to read and execute the programs recorded on the recording medium, the above-described component insertion method can be implemented.

The above embodiments are examples, and various modifications can be made without departing from the scope of the disclosure. Each of the above-described embodiments can be established independently, and combinations of the embodiments are also possible. Further, various features in different embodiments can also be established independently, and combinations of the features in different embodiments are also possible.

What is claimed is:

1. A component insertion device for inserting a specific part of a workpiece into a flexible printed circuit connector having a slot in an elongated straight shape, the specific part of the workpiece has a flat plate shape to be fitted into the slot, comprising:
   a robot; and
   a controller for controlling operations of the robot,
   wherein the robot has:
   a gripper having a pair of claws configured to clamp the workpiece in a state where the specific part is protruded to outside; and
   a force sensor configured to detect a contact reaction force received by the workpiece from a periphery of the slot of the receiving part via the gripper,
   the pair of claws has specific shapes for bending or flexing at least the specific part of the workpiece such that an effective thickness dimension at a tip end surface of the workpiece increases when approaching each other to clamp the workpiece, and
   the controller comprises a processor configured to:
   perform a processing of making the pair of claws approach each other and clamp the workpiece in the state where the specific part is protruded to the outside while the pair of claws bend or flex the specific part such that the effective thickness dimension at the tip end surface does not exceed a width of the slot; and
   perform with the robot a processing of inserting the specific part of the workpiece clamped by the pair of claws into the slot of the flexible printed circuit connector along an insertion direction perpendicular to the tip end surface, which is formed by the specific part, by a compliance control based on an output of the force sensor.

2. The component insertion device according to claim 1, comprising:
   a camera for imaging the tip end surface, which is bent or flexed in the thickness direction, of the workpiece clamped by the pair of claws,
   wherein the processor is further configured to calculate the effective thickness dimension at the tip end surface of the workpiece based on an image of the tip end surface obtained by the camera, and
   the processor variably sets a distance between the pair of claws based on the effective thickness dimension at the tip end surface so that the effective thickness dimension is less than a transverse-direction dimension of the slot.

3. A component insertion method for inserting a specific part of a workpiece into a flexible printed circuit connector having a slot in an elongated straight shape by the component insertion device according to claim 1, the specific part of the workpiece has a flat plate shape to be fitted into the slot, characterized in:
   after performing the processing of making the pair of claws approach each other and clamp the workpiece in the state where the specific part is protruded to the outside while the pair of claws bend or flex the specific part such that the effective thickness dimension at the tip end surface does not exceed the width of the slot,
   performing with the robot the processing of inserting the specific part of the workpiece clamped by the pair of claws into the slot of the flexible printed circuit connector along the insertion direction perpendicular to the tip end surface, which is formed by the specific part, by the compliance control based on the output of the force sensor.

4. A non-transitory computer readable recording medium comprising a program for causing a computer to execute:
   controlling operations of a robot as claimed in claim 1;
   a processing of making the pair of claws of the robot to approach each other and clamp a workpiece in a state where a specific part of the workpiece is protruded to the outside while the pair of claws bend or flex the specific part such that an effective thickness dimension at a tip end surface of the workpiece does not exceed a width of a slot of a flexible printed circuit connector into which the specific part is to be inserted; and
   a processing of inserting the specific part of the workpiece clamped by the pair of claws into the slot of the flexible printed circuit connector along an insertion direction perpendicular to the tip end surface, which is formed by the specific part, by a compliance control based on an output of the force sensor.

* * * * *